United States Patent [19]

Malvern

[11] Patent Number: 5,650,849
[45] Date of Patent: Jul. 22, 1997

[54] OPTICAL RATE SENSOR HAVING MODULATED CLOCKWISE AND COUNTERCLOCKWISE BEAMS

[75] Inventor: Alan Richard Malvern, Devon, Great Britain

[73] Assignee: British Aerospace Public Limited Company, Farnborough, United Kingdom

[21] Appl. No.: 324,477

[22] Filed: Oct. 17, 1994

[30] Foreign Application Priority Data

Oct. 16, 1993 [GB] United Kingdom ............... 9321403
Sep. 3, 1994 [GB] United Kingdom ............... 9417715

[51] Int. Cl.⁶ ............................................. G01C 19/72
[52] U.S. Cl. ............................................. 356/350
[58] Field of Search ................................. 356/350

[56] References Cited

U.S. PATENT DOCUMENTS

4,456,376  6/1984  Carrington et al. ............... 356/350
4,705,399  11/1987  Graindorge et al.
4,840,489  6/1989  Coccoli.
5,262,843  11/1993  Sugarbaker et al. ............... 356/350
5,459,575  10/1995  Malvern.

Primary Examiner—Samuel A. Turner
Attorney, Agent, or Firm—Cushman, Darby & Cushman IP Group of Pillsbury Madison & Sutro LLP

[57] ABSTRACT

In an open loop rate sensor clockwise (CW) and counterclockwise (CCW) beams from a common source 10 pass in opposite directions around a coil 20 of optical fiber and recombine on a detector 24. A phase modulator 22 applies a stepped phase modulation in which each step is of duration equal to the transit time of the coil 20 and in which alternate steps are zero. The intermediate steps increase linearly from zero to $2\pi$. Without modulation, the CW and CCW beams combine on the detector with a combined intensity which varies as a cosine of rate. The above modulation causes two points to either side of the cosine fringe to be sampled which move progressively farther as the amplitude of the stepped modulation increases. The sample data is processed to determine the rate applied to the rate sensor.

18 Claims, 11 Drawing Sheets

Fig. 3
POSITIVE RATE SIGNALS (SUM AND DIFFERENCE)

Fig. 4
NEGATIVE RATE SIGNALS (SUM AND DIFFERENCE)

Fig. 5
SUM DATA FOURIER TRANSFORM

Fig. 6
DIFFERENCE DATA FOURIER TRANSFORM

OPTICAL RATE SENSOR HAVING MODULATED CLOCKWISE AND COUNTERCLOCKWISE BEAMS

FIELD OF THE INVENTION

This invention relates to optical gyroscopes and in particular to open loop interferometric fiber optic rate sensors.

BACKGROUND OF THE INVENTION

In an interferometric fiber optic gyroscope a clockwise (CW) beam and a counterclockwise (CCW) beam pass around a coil of optical fiber and are brought together on leaving the coil to interfere on a detector. Rotation applied to the rate sensor induces a rate-related non-reciprocal phase shaft between the CW and CCW beams which causes the intensity on the detector to very co-sinusoidally with applied rate.

In general, two different methods of signal processing may be used. In closed loop systems, a compensatory non-reciprocal phase shift is applied to null the phase shift induced by rotation. In open loop systems, the intensity of the combined beams at the detector is used to determine the applied rate. In both methods, the measurand is linearly related to rate with the constant of proportionality being referred to as the Scale Factor.

Previously it has been thought necessary to use a closed loop architecture to achieve high accuracy of the scale factor. In this context, high accuracy means a scale factor performance which does not differ by more than 100 ppm with respect to an ideal output over a rate range of +/−500 deg/sec or greater, which is the rate range needed for aircraft and missile applications. Such an accuracy is needed for inertial navigation in both civil and military applications, and for guidance of long range missiles.

For agile military aircraft or naval vessels, where typically a ring laser gyroscope system is currently used, an even higher scale factor accuracy of about 5 ppm over the rate range is needed, and this represents one of the highest accuracy scale factor requirements.

To allow a rate sensor to replace the more expensive ring laser gyroscope for these applications, scale factor performance at this level is required. Replacement of ring laser gyroscopes by rate sensors is likely to produce a much lower cost navigation system, as the cost of the gyroscope sensors is one of the largest elements in the cost of the overall system.

For a fiber optic sensor with closed loop architecture, optical modulation is applied so that at zero rate there is a null signal. At rate, after demodulation, a signal is derived which is proportional to rate. This is used to operate a feedback loop as the error signal, and a second signal is applied to a phase modulator to null out this error signal. In a typical example, the modulation comprises a square wave operating at the correct frequency for the fiber coil. This is the frequency that causes a phase shift of 180° between the two directions when the phase modulator is placed at one end of the coil, after a circuit of the coil and recombination, and is given by 1/(2*loop transit time). The loop transit time is the time taken for light to propagate from one end of the coil to the other. The feedback signal is typically a serrodyne ramp applied to a phase modulator in the optical circuit. This comprises a linear phase modulation ramp going from 0 radians to $2\pi$ radians in a time t and then being reset to zero quickly, with the process then restarted. If the top of the ramp is exactly $2\pi$ radians, this corresponds to a frequency shift of 1/t Hz, and this frequency shift is that needed to null out the rate signal, and the frequency is then the rate output. This signal is normally applied at the other end of the sensing coil to the square wave modulation, to null out the applied rate. In this case, the output of the gyroscope is then the frequency of the serrodyne ramp which is proportional to rate. This gives very good scale factor performance over a broad rate range but suffers from the following disadvantages:

(a) The light around the loop is at a different frequency in the CW and CCW directions, so that the gyroscope is fundamentally non reciprocal, and thus the gyroscope bias performance may be degraded.

(b) It is necessary to implement a very accurate servo loop to hold the serrodyne reset amplitude at exactly $2\pi$ radians. Methods of doing this have been devised, but there are problems in implementation at low rates when there is not a lot of information to drive the servo. In one implementation, the signal to drive the servo is obtained at the flybacks which occur seldom at very low rates.

(c) Any feedback loop which has the attributes of gain and feedback may suffer from lock-in behaviour at low rate. This causes extreme scale factor errors in a rate range around zero rate so that sensitivity may be severely affected or completely lost.

By contrast, the conventional open loop gyroscope schemes are believed to offer good gyroscope drift performance due to the high degree of reciprocity, but generally poor scale factor performance due to the difficulty of accurately following the cosine wave curve of light output against rate to very high precision.

In our earlier U.K. Patent Application No. 9304016.0, which corresponds to U.S. Pat. No. 5,459,575, I describe a signal processing technique which involves the extraction of three signals at frequencies 1f,2f and 4f (with a modulation frequency of 1f) from the photodetector signal to account for three unknowns: the angular rate (i.e. the desired output); the intensity of light on the photodetector, and the amplitude of the phase modulation.

This compensation is needed as the intensity of light and the amplitude of the phase modulator are both subject to change due to external perturbations such as temperature and time and these parameters enter into the equation determining the rate. In our earlier technique, two ratios are formed from the three signals to eliminate the intensity effects, end the inverse tangent is taken of one ratio (1f/2f) to extract the rate, and the other ratio (2f/4f) is used to determine the amplitude of phase modulation.

This is a fairly complicated scheme, and requires three signal channels at the three frequencies which need to be very closely matched so that the ratios are meaningful. It is an aim of this invention to provide an optical gyroscope which obviates at least some of the above disadvantages.

SUMMARY OF THE INVENTION

Accordingly this invention provides an optical gyroscope, comprising:

means defining a coil or ring around a sensing axis and around which light may propagate in a clockwise (CW) and a counterclockwise (CCW) direction;

beam input means for introducing into the coil or ring a clockwise (CW) beam and a counterclockwise (CCW) beam to propagate in opposite directions around the coil or ring;

means for combining the CW and CCW beams after passage around the coil or ring:

detector means for detecting the intensity of the combined CW and CCW beams, phase modulator means for applying between the CW and CCW beams a plurality of different phase shifts, and processor means for monitoring the corresponding detected intensity for each of the phase shifts, thereby to sample the intensity across at least a major portion of a complete fringe.

Preferably the phase modulator applies between the CW and CCW beams a plurality of phase shifts sufficient to sample substantially a complete fringe, the shifts preferably comprising a series of phase shifts made up from a plurality of positive phase shifts of predetermined magnitudes and a corresponding plurality of negative phase shifts of magnitudes equal to the positive magnitudes. The series preferably comprises a plurality of pairs of adjacent positive and negative phase shifts of substantially the same magnitude, the magnitude of the pairs progressively varying through the series.

The magnitude of the phase shift may increase in stepped linear fashion from 0 to $2\pi$. However, in a preferred embodiment the profile of the ramp defined by the steps is non-linear to concentrate the data points around the maximum sensitivity regions at low rates at the points of inflexion. In this way, a good balance is achieved between performance at low rates, when the best needed, while retaining the excellent scale factor performance at high rates.

A preferred profile comprises a generally linear ramp with a modulation component impressed thereon. The modulation component is preferably periodic and in a preferred embodiment is of sinusoidal form.

The gyro preferably includes servo-control means for controlling the maximum phase modulation to be The phase modulator means preferably applies to both the CW and CCW beams, at one end of the coil or ring, stepped modulation waveform wherein the duration of each step is substantially equal to the transit time of the coil or ring, with the modulation waveform preferably being of magnitude $o,\Delta\phi_1, o,\Delta\phi_2, o,\Delta\phi_3 \ldots 2\pi$, whereby the modulation sweeps across $2\pi$ of the intensity fringe. For each magnitude of phase shift, the processor means preferably monitors the detected intensity for a positive shift and that for a negative shift.

The processor means preferably determines the sum and the difference of the two intensities monitored for each magnitude of phase shift, thereby to obtain a series of sum data and difference data respectively, and the processor determines the rate experienced by the gyroscope on the basis of at least one of the sum and difference data.

There is a variety of ways of extracting the rate data. The processor means may apply a Fourier Transform to at least one of the sum and difference data, thereby to obtain the applied rate. Alternatively the processor means may multiply the sum and difference data by a cosine and a sine function respectively, and integrating over the whole fringe.

In one embodiment, the processor means:

(i) multiplies the sum data by a cosine function and integrates to give a first signal, (ii) multiplies the sum data by a sine function and integrates to give a second signal, (iii) multiplies the difference data by a cosine function and integrates to give a third signal, and (iv) multiplies the difference data by a sine function and integrates to give a fourth signal, and uses the first, second, third and fourth signals to obtain the rate applied.

Whilst the invention has been described above, it extends to any inventive combination of features set out above or in the following description.

BRIEF DESCRIPTION OF THE DRAWINGS

The invention may be performed in various ways and various embodiments thereof will now be described by way of example, reference being made to the accompanying drawings, in which.

DESCRIPTION OF THE PREFERRED EMBODIMENTS

Figure 1:
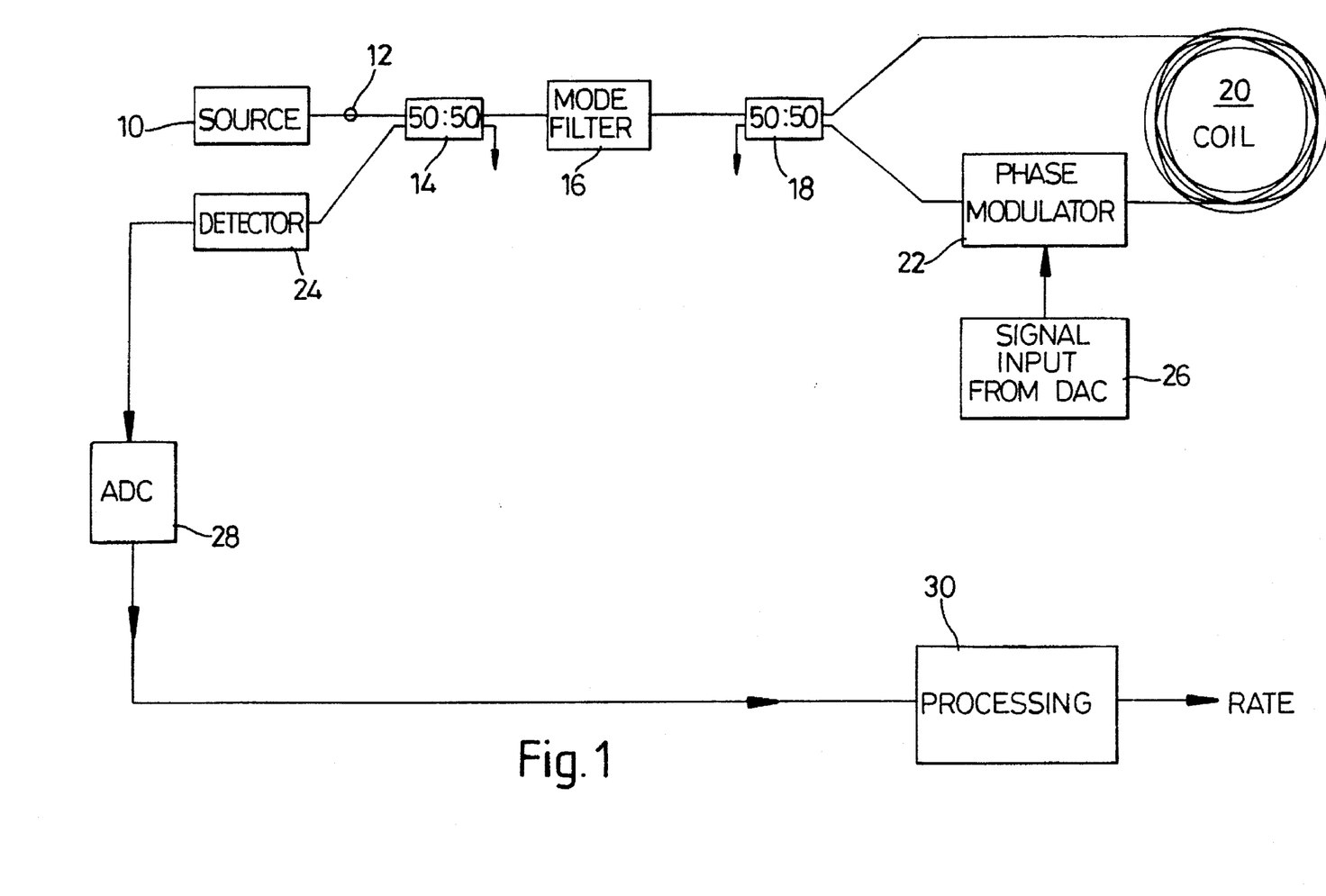
FIG. 1 is a schematic figure illustrating a first embodiment of an open loop fiber optic rate sensor.

Referring initially to FIG. 1, light from a broad band source 10 such as an edge emitting light diode (ELED) or a superluminescent diode (SLD) is coupled into a single mode fiber 12 to a first 50:50 coupler 14. From there the light passes via a mode filter or polarizer 16 to a second 50:50 coupler 18 which splits the beam to form CW and CCW beams which pass into the opposite ends of a coil 20 of optical fiber. At one end of the coil 20 is a broadband phase modulator 22 (typically of lithium niobate). The second coupler 18 and the phase modulator 22 may both be part of an integrated optics circuit.

Where an integrated optics circuit is used, there are two possibilities for connecting the ends of the coil 20 to the integrated optics circuit, depending on whether the coil fiber is of high birefringence fiber. When the coil is of high birefringence fiber, the integrated optics circuit is fiber-coupled to two fibers, typically of high birefringence fiber, which are fusion coupled to the high birefringence coil fiber.

Alternatively, where the coil is not of high birefringence fiber, depolarizers may be attached to the two high birefringence output fibers which are then attached to the relatively low birefringence coil. The depolarizers may each comprise a length of high birefringence fiber fusion spliced so that its fast and slow axes are at 45° to the corresponding axes in the high birefringent fibers from the integrated optics circuit.

After having passed around the coil, the CW and CCW beams are recombined at the second coupler 18, and then pass via the mode filter or polarizer 16 to the first coupler 14 which passes a component of the combined beam to a photodetector 24.

Figure 2:
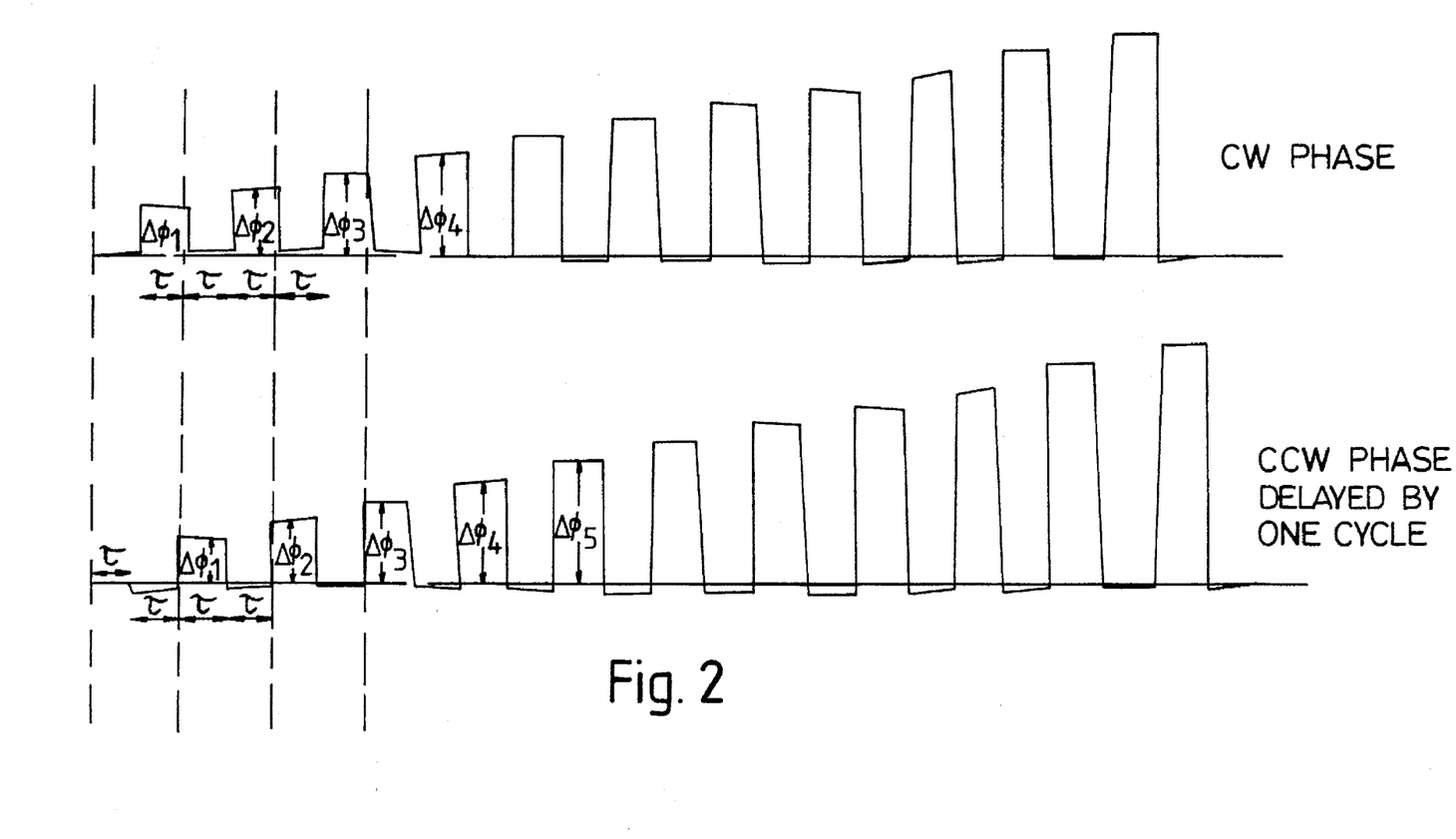
FIG. 2 is a diagram illustrating the phase modulation applied to the CW and CCW beams.

The phase modulation applied by phase modulator 22 is shown in FIG. 2. The upper trace shows the phase modulation seen by the CW beam, and the lower trace that seen by the CCW beam. Each phase modulation step has a duration of $\tau$, where $\tau$ is the loop transit time, so that the CCW phase is equivalent to the CW phase delayed by one step, because the phase modulator is located at the CW end of the coil 20. The step height or amplitude is changed as a linear ramp, starting at zero, and increases at a steady rate to $2\pi$ and then resets to zero. Thus at time $0<t<\tau$, the step height is zero, at time $\tau<t<2\tau$, the step height is $\Delta\phi_1$, at time $3\tau<t<4\tau$ the step height is $\Delta\phi_2$, and so on.

It will be seen that the modulation is made up of a series of pairs of positive and negative phase shifts $\Delta\phi_n$, the magnitude of each phase shift within the pair being equal, but the magnitude between pairs increasing stepwise from zero to $2\pi$, and then resetting to zero. Thus the drive signal to the phase modulator 22 steps as follows $0, v_1, 0, v_2, 0, v_3$.

In the absence of applied rate, and with no phase modulation, the intensity detected by the photodetector 24 should be at a maximum, corresponding to the peak of the cosine curve relating intensity to rate (otherwise referred to herein as the fringe). In general, with the series of progressively increasing phase shifts of alternate sign, the cosine curve is effectively sampled at a series of pairs of phase sample points symmetrically disposed relative to the zero phase modulation point. In the special case where there is no applied rotation and the intensity on the photodetector is at a maximum, the positive/negative pairs of samples will each be of the same magnitude as they move down either side of the curve. When rotation is applied, this will cause the fringe or cosine curve to shift to an extent end in a direction dependent upon the magnitude and sense of the applied rotation, so that the zero phase modulation point moves down one of the flanks of the cosine curve. The positive/negative pairs of samples will thus tend to be of different magnitude but they will still sample a complete $2\pi$ period of the cosine curve provided the phase modulation ramps up to $2\pi$.

The reason for the shape of the phase steps can be understood from the following equations. The general expression for this intensity of the light I at the photodetector 24 may be written as:

$$I_i = a_0 + a_1[1 + \cos(a_2 + \Delta\phi_1)]$$

$$\Delta_{\phi_i} = a_3 \Delta V_i = a_3[V_i(t) - V_i(t-\tau)] \quad (1)$$

where $a_0$=electronic offsets $a_1$=intensity of fringe pattern $a_2 S\Omega$ where S is the scale factor of the gyroscope and $\Omega$ is the angular rate (radians/sec)

$a_3$=scale factor of phase modulator (radians/V)

$V_i(t)$ is the input voltage to the phase modulator 22 and $\tau$ is the loop transit time.

The phase modulation is applied at one end of the coil and suffers a delay of one loop transit time ($\tau$) between the two directions, so the difference appears in the equation (1). As set out above, for each positive value of $\Delta V$ it is possible to generate a negative value by reversing the sense of the voltage change.

A 16 bit digital-to-analogue convertor (DAC) 26 is used to apply voltages to the phase modulator 22 synchronized with the loop transit time. Thus a sequence 0,V,0 from the DAC 26 causes a positive $\Delta V$ to be followed by an accurately matched negative $\Delta V$ at a time period $\tau$ later. This causes two points either side of the cosine fringe to be sampled, which at zero rate will have the same intensity as explained above. For each magnitude $V_i$, the intensity $I_i^+$ and $I_i^-$, of the two points sampled may be written:

$$I_i^+ = a_0 + a_1[1 + \cos(a_2 + a_3\Delta V_i)]$$

$$I_i^- = a_0 + a_1[1 + \cos(a_2 - a_3\Delta V_i)] \quad (2)$$

and for each magnitude $V_i$ a difference $\Delta I_i$ and a sum $\Sigma I_i$ of the two values may be obtained as follows:

$$\Delta I_i = I_i^+ - I_i^- = 2a_1 \sin a_2 \sin a_3 \Delta V_i$$

$$\Sigma I_i = 2(a_0 + a_1) + 2a_1 \cos a_2 \cos a_3 \Delta V_i \quad (3)$$

so that two signals are derived from the data, the sum ($\Sigma I_i$) and the difference ($\Delta I_i$).

An analogue-to-digital convertor (ADC) 28 with 16 bit resolution is used with a sample and hold amplifier (not shown) before it. The signal gathering is synchronized with the signal on the digital-to-analogue converter 26. The sample and hold amplifier has a broad bandwidth to ensure that the transitions between values are not spread into the data that is being collected.

The sum and difference signals have a cosine and sine wave dependence respectively on rate, and a cosine and sine dependence on the phase modulation amplitude $\Delta\phi_i$, which corresponds to the time axis.

In order to extract the rate from this data, various approaches are possible. One that is attractive is the use of fast Fourier transforms. A single complex Fourier transform can be used with the sum and difference as the real and imaginary parts on input, and on output the two transforms can be separated as follows:

If h(t) is real, then H(f)=H(f)* where H(f) is the complex Fourier transform of h(t)

If h(t) is imaginary then H(−f)=−H(f)* thus

H(−f)+H(f)*=2H(f)$_{real}$ and

H(−f)−H(f)*=2H$_{imag}$ so that from the single complex Fourier transforms, the transforms of the real and imaginary parts can be separately extracted, corresponding to the sum and difference signals.

In order to use fast Fourier transforms (FFT) the data set needs to have $2^n$ data points, where n is an integer. In a typical case n=7, corresponding to 128 points for both the sum and difference signals.

For a 600 meter fiber coil, the synchronous frequency is about 170 kHz giving 340 kilosamples per second with each positive sample being followed by the corresponding negative sample. Analogue-to-digital converters and digital-to-analogue converters are available with a 16 bit resolution to give this frequency capability. To accumulate the 256 points will take 0.7 milliseconds, and typically 400 microseconds to carry out the FFT using a typical digital signal processor (DSP) 30 such as the AT&T DSP32C which runs at a 50 MHZ clock rate with 25 million floating point operations per second (MFLOPS) processing power.

Figure 3:
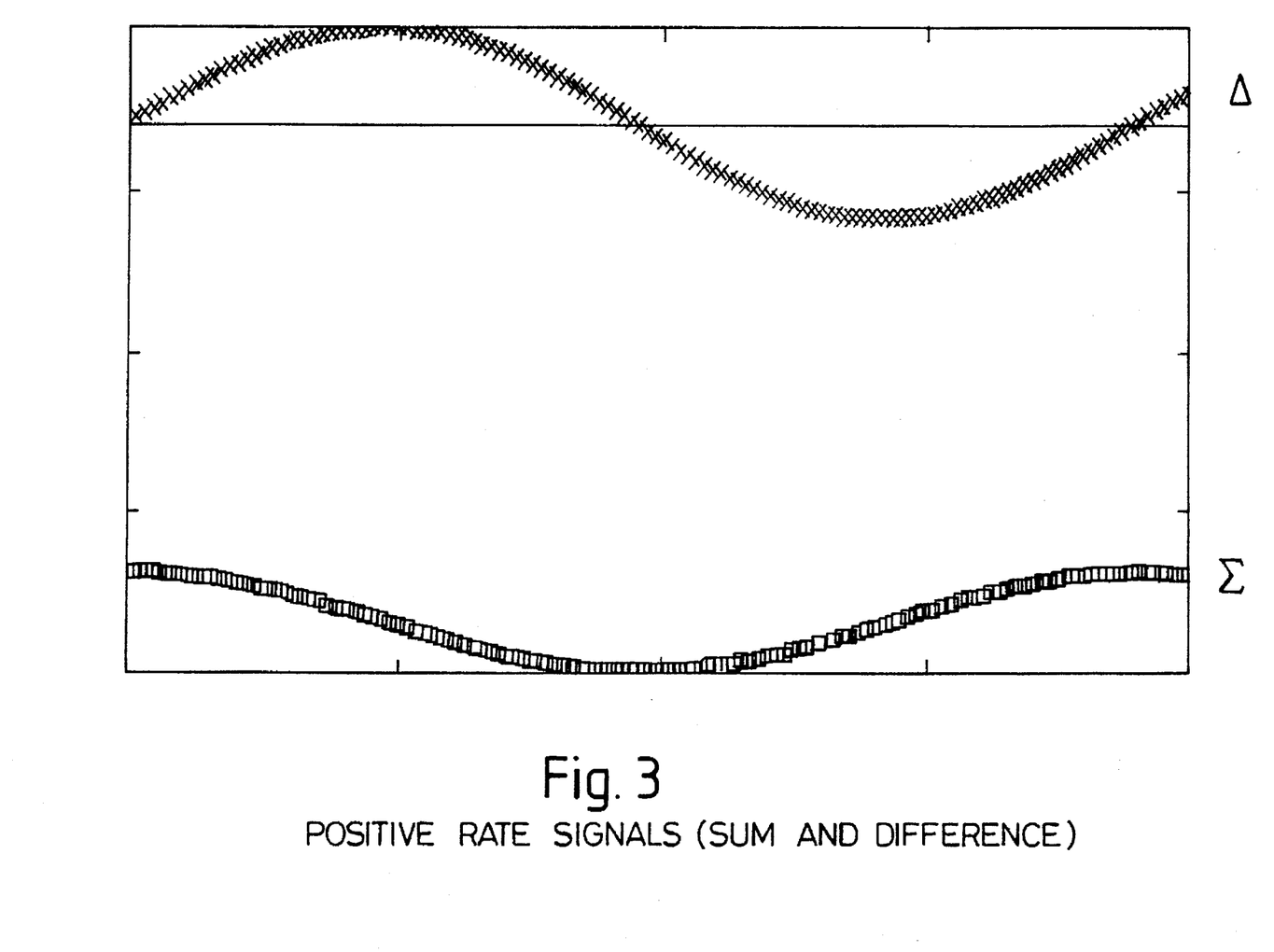
FIGS. 3 and 4 are diagrams illustrating the sum and difference signals for successive pairs of intensities detected, for a positive rotational rate and a negative rotational rate, respectively.
Figure 4:
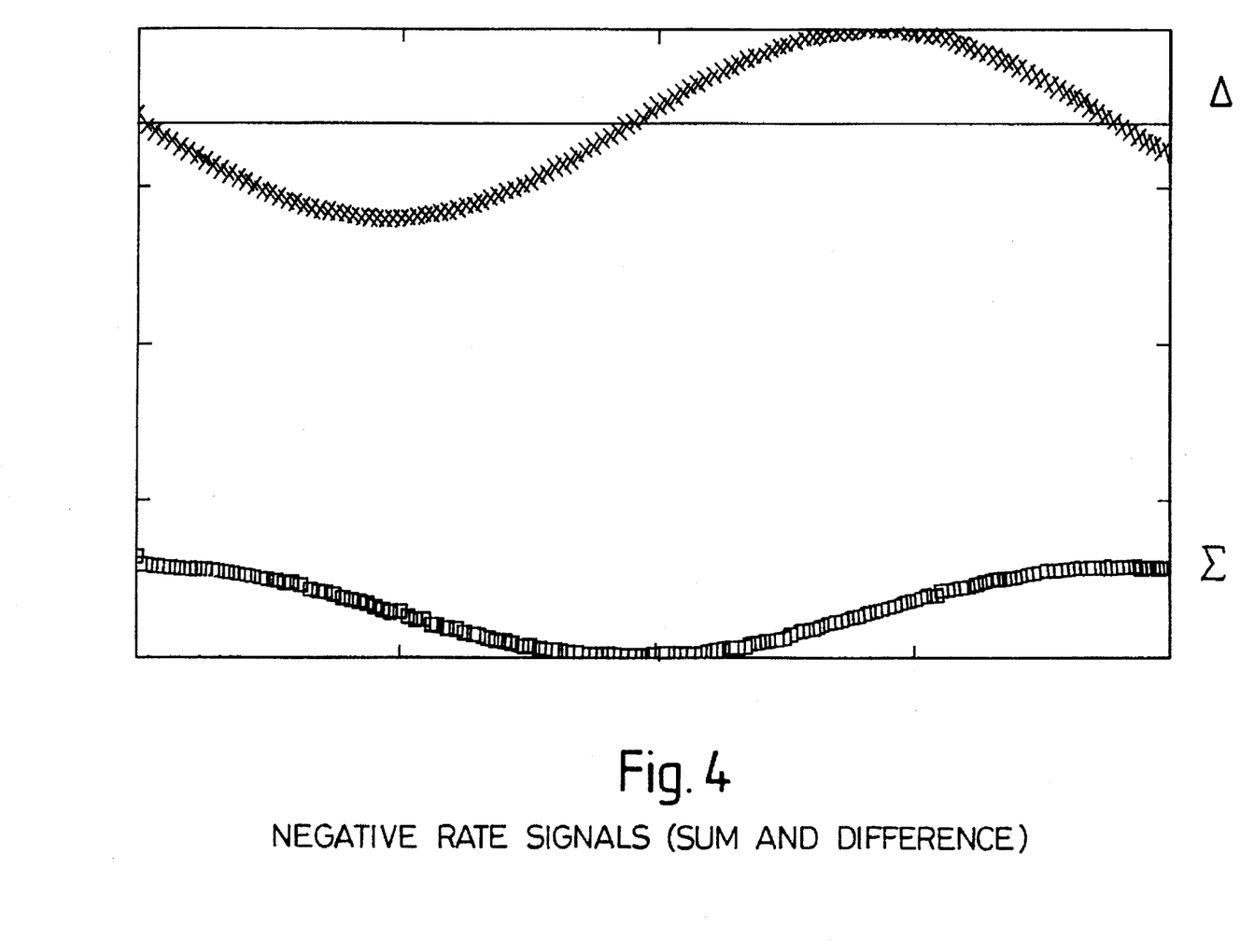

FIGS. 3 and 4 show the sum and difference signals for +10 deg/sec rate and −10 deg/sec rate with 128 data points. This clearly shows the cosine and sine dependence on time of the two sets of data for the sum and difference. Also shown is the phase inversion in the difference data between the positive and negative rates while the sum data has the same phase.

Figure 5:
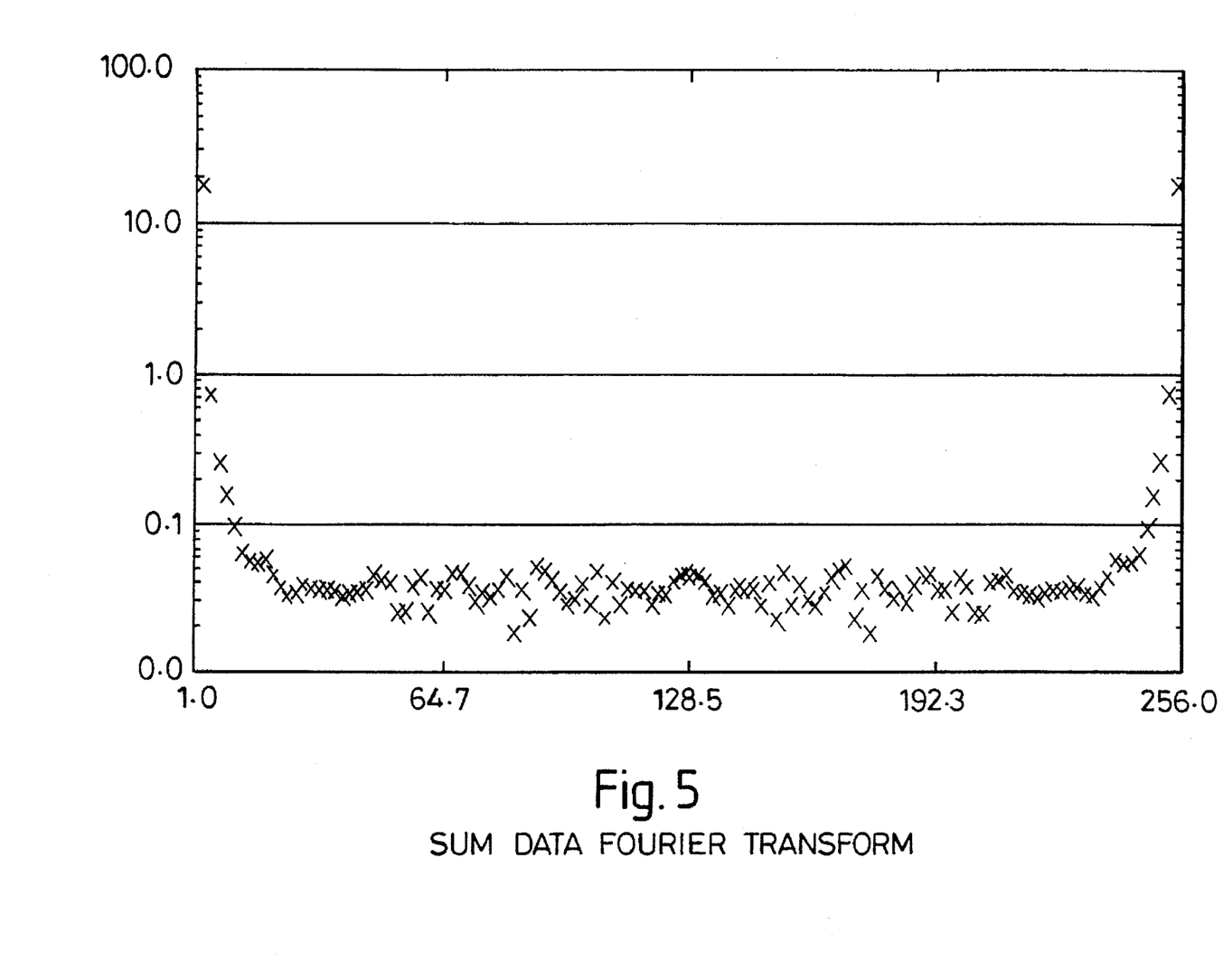
FIGS. 5 and 6 are diagrams illustrating the Fourier Transforms of the sum data and the difference data of FIGS. 3 and 4 respectively.
Figure 6:
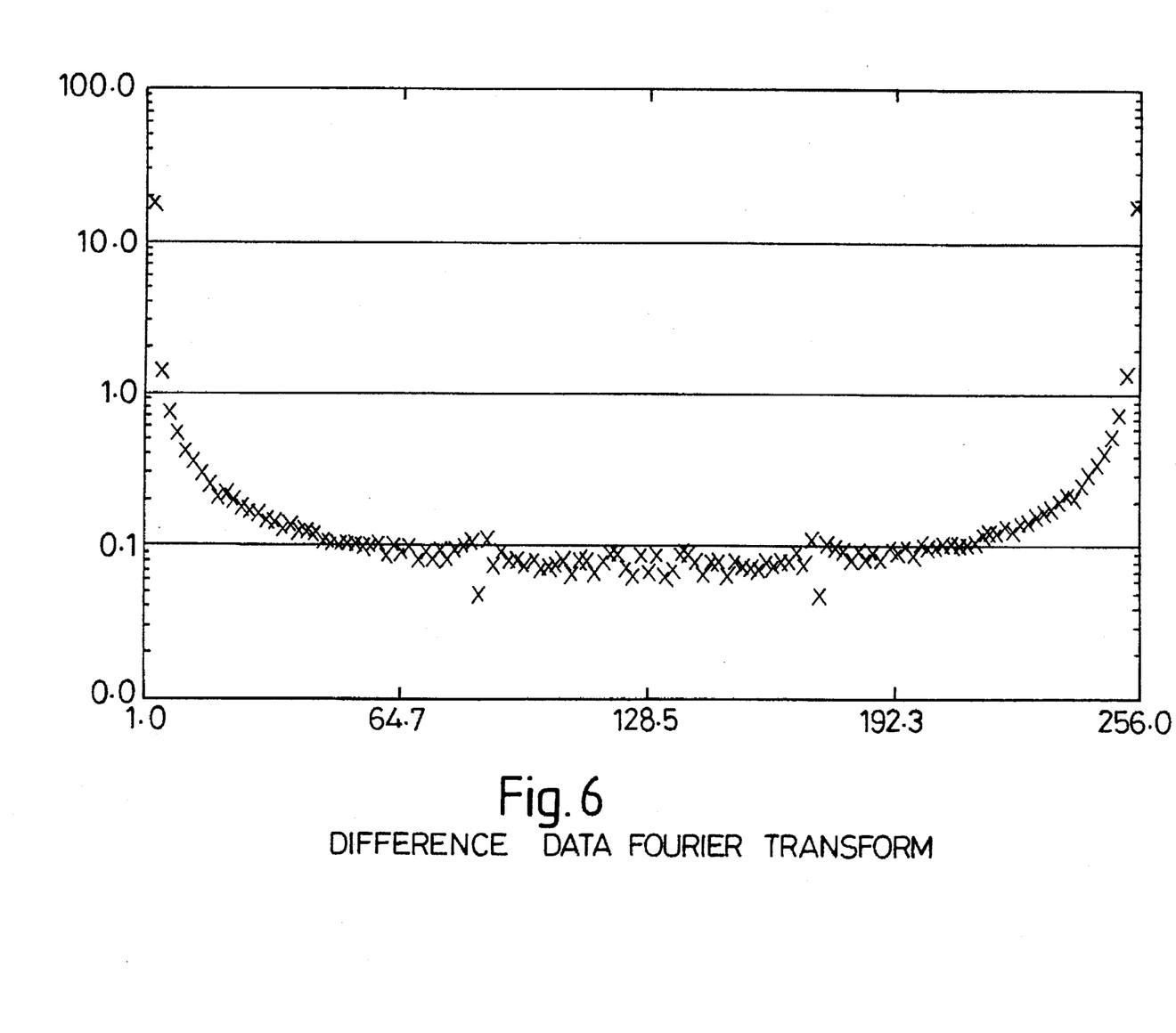

FIGS. 5 and 6 show the FFT, giving the amplitude in the channels for the sum and difference data respectively for −10 deg/sec rate. Each of the sum and difference signals has a DC offset which shows in the first channel of the FFT. The second channel of the FFTs of the sum and the difference signals gives the rate signal. As there is no windowing in the FFTs, the information from the rate is spread over several channels, so that the correct amplitude can be written as:

$$N_p = \frac{\sum_{60}^{128}(H_i^2 + H_{i+1}^2)}{34} \qquad (4)$$

$$S = \sum_{3}^{40}(H_i^2 + H_{i+1}^2 - N_p)$$

Where $N_p$ is the noise power and S is the signal power for the Fourier transform of both the sum and difference signals. In the summation in equation (4) the (i)th element is the real part and the (i+1)th element is the imaginary part. This summation of the real and imaginary parts is needed in this particular technique, because the exact phase of the signals is not known. The summation for the signal goes from n=3, as n=1 and n=2 correspond to the real and imaginary parts of the DC term, which does not correspond to the required signal. This summation applies for a FFT with 128 data points. The value of N in (3) defines the noise power per channel which is assumed to be white. The sum over the higher frequency components is used to give the noise power value, which is then subtracted from the signal information defining the signal power S. The rate is extracted as follows:

$$\text{rate} = a\tan^{-1}\sqrt{(S1/S2)} \qquad (5)$$

where S1 and S2 are the signals for the difference and sum terms respectively. Taking this ratio removes the effect of intensity variations. This ratio also needs to include the signs of the amplitude of the Fourier transforms, which are given by the sign of the imaginary part of the difference sign and the sign of the real part of the sum signal.

This inverse tangent gives the rate in terms of a phase angle, and this is converted into a rate in deg/sec by a knowledge of the scale factor of the gyroscope by previous calibration, as the phase angle ($a_2$) rate ($\Omega$) and scale factor (S) are related thus: $-a_2 = S\Omega$.

The benefits of the above approach using Fast Fourier Transforms, include the following:
1. There is only a single channel of information which is used to extract all the information, unlike the previous open loop gyroscope scheme described above, which has three channels.
2. The effect of intensity variation is eliminated by the taking of ratios to give the inverse tangent.
3. The effect of variation of the phase modulation amplitude is to change the frequency of the signal in the FFT. This will change by a small amount in relation to the width of the frequency channels of the FFT, and this small change will cause greater side band amplitudes. This however is not critical as it is known that there is only one signal to be considered in the FFT and the summation over the first few channels will take account of these signals. Therefore the method is relatively insensitive to the variation of the phase modulator scale factor.
4. The noise is eliminated by subtraction of the higher frequency components.
5. The analysis is done in the digital regime and so should be highly accurate after conversion to digits from the analog signals. This includes the DAC end ADC, which are 16 bit devices in the practical implementation. It has been shown that 16 bits are sufficient to give the required level of accuracy to meet the needs of an inertial navigator.
6. All the data can be gathered and analyzed in 1 millisecond, so that the real time extraction of rate can take place with a good bandwidth when a typical digital signal processor is used with typical DAC and ADC for a 600 m coil, which is a typical length for a medium accuracy rate sensor.
7. The use of an open loop gyroscope gives better gyroscope bias stability as the reciprocity is better than an equivalent closed loop rate sensor which normally has a different frequency of light in the two directions.

Alternative approaches to that set out above extract the rate without requiring Fourier Transforms. Embodiments incorporating this alternative should be faster and offer greater accuracy and consistency.

In a second embodiment, in order to improve the operation of the digital sisal processing, the peak voltage going into the phase modulator is controlled by a servo system in order to ensure that the scan is over exactly a complete fringe. In this embodiment, this is done by implementing a phase locked loop.

Figure 7:
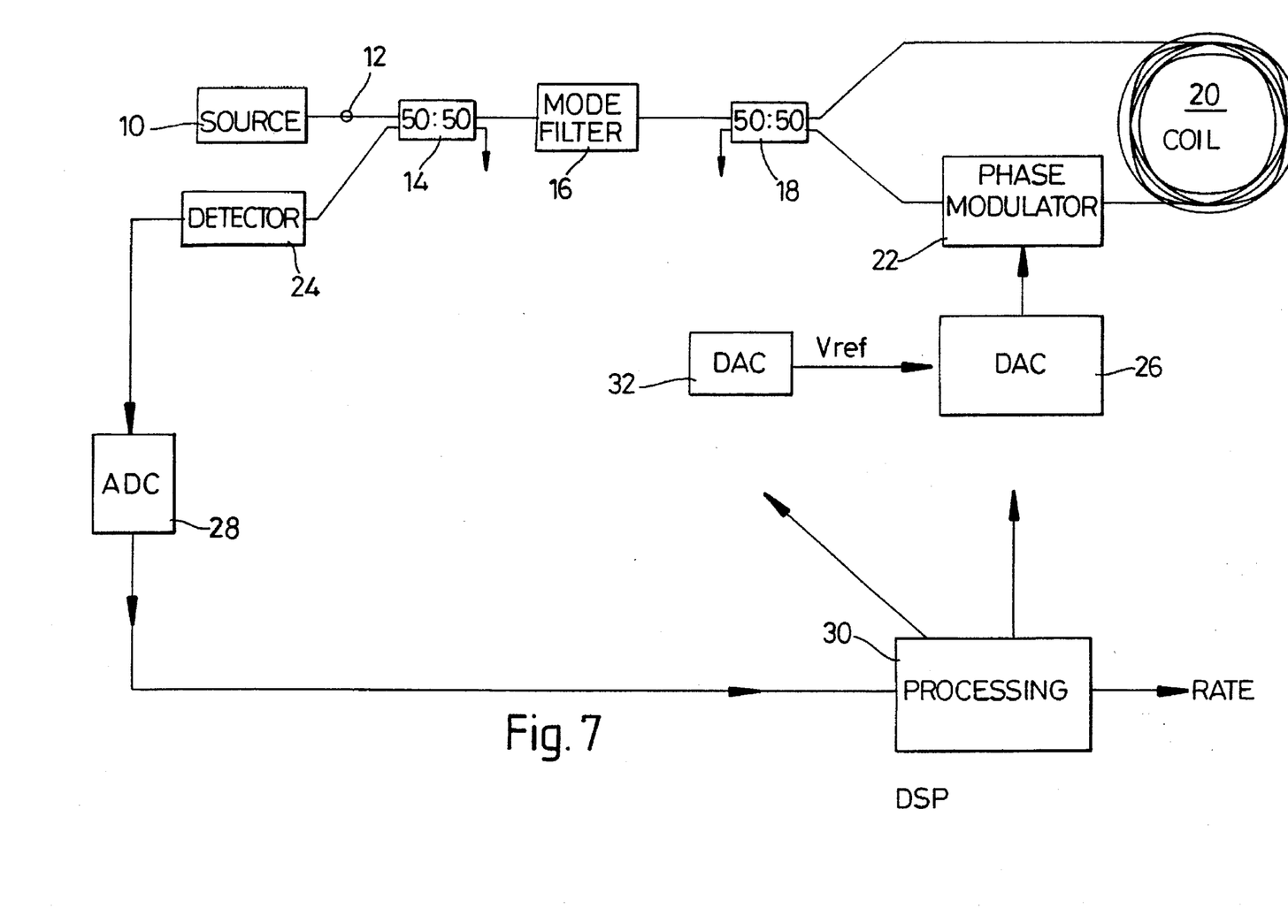
FIG. 7 is a schematic figure illustrating a second embodiment of an open loop fiber optic rate sensor which incorporates a control loop to set the maximum magnitude of the phase modulation.

Referring now to the second embodiment illustrated in FIG. 7, the optical arrangement is the same as in FIG. 1, and the same form of phase modulation is applied as in FIG. 2. The sum and difference signals are extracted as above to give a cosine and sine wave response respectively. The frequency of these signals will be set by the voltage applied to the phase modulator. If a complete fringe is exceeded the frequency will be higher and vice versa. From Equation (3) above, the sum and difference signals can be written as:

$$\Delta I_f = 2\, a_1 \sin a_2 \sin a_3\, \Delta V_i$$

$$\Sigma I_f = 2(a_0 + a_1) + 2\, a_1 \cos a_2 \cos a_3\, \Delta V_i \qquad (3)$$

where $a_3$ is the scale factor of the phase modulator (radians/V). This will vary over time and is not well determined, and so needs to be eliminated as a variable from the equation. This is the purpose of the phase locked loop. Four signals are extracted as follows:

$$C_1 = \int_0^{\frac{2\pi}{\omega}} (\Sigma I)\cos\omega t\, dt \qquad (6)$$

$$S_1 = \int_0^{\frac{2\pi}{\omega}} (\Sigma I)\sin\omega t\, dt$$

$$C_2 = \int_0^{\frac{2\pi}{\omega}} (\Delta I)\cos\omega t\, dt$$

$$S_2 = \int_0^{\frac{2\pi}{\omega}} (\Delta I)\sin\omega t\, dt$$

where $\omega$ is the desired frequency (determined by the extent of the phase shift and the time taken to sample the fringe), when a complete fringe is exactly scanned. When the frequency is incorrect, there will be a phase shift between the reference frequency ω and the input signal. The sum signal is used to derive an error signal for the control loop as this signal is present even in the absence of rate, and only disappears at one particular rate which is fairly high in value. The phase at the end of the integral is given by:

$$\phi_n = \tan^{-1}\left(\frac{S_1(n)}{C_1(n)}\right) \quad (7)$$

where n is the n th set of readings. In practice, the integral is performed by a summation of the data acquired on the ADC over the ramp interval, multiplying this data with a sine or cosine function. In Appendix A there is a Fortran program which simulates the signal processing, and this includes simulation of electronic noise on the photodetector. This noise does not affect the accuracy of the result.

The error signal for the servo is then the difference in phase between the n th and (n−1)th set of data, so that the peak voltage onto the phase modulator is given by;

$$V_{(new)} = V_{(old)} - \text{gain}*(\phi_n - \phi_{n-1}) \quad (8)$$

where "gain" is the proportional gain of the servo, which is set by experiment to give a stable servo operation. After several cycles this will converge onto the correct value to give a complete fringe.

When the correct peak operating voltage is reached, which should happen after several cycles as in equation (8), then the four signals of (6) contain the information to extract the rate, as the integral over 2(10)π gives the correct Fourier components.

The angular rate is then given by:

$$\text{rate} = \tan^{-1}\left(\frac{\text{sign}\sqrt{C_2^2 + S_2^2}}{\sqrt{(C_1^2 + S_1^2)}}\right) \quad (9)$$

where $$\text{sign} = \frac{S_2}{\text{abs}(S_2)}$$

as the sign of the $S_2$ integral gives the sense of the rate.

This approach is believed to be quicker to implement than the use of the Fourier Transform in software, and the operation of the servo implies that there is always a scan across a complete fringe, so the results should be consistently accurate.

The schematic of the electronics is shown in FIG. 7. The DAC 26 that drives the phase modulator has the same step signals as shown in FIG. 2 of the previous embodiment, with the data synchronized with the loop transit time. The additional element is a second DAC 32 which sets the reference voltage of the first DAC 26, by applying a voltage $V_{(ref)}$ as a reference to the first DAC. Changing the reference voltage $V_{(ref)}$ of the first DAC 26 changes the peek voltage. The processor 30 adjusts the voltage $V_{(ref)}$ in accordance with the output of the servo. An integrator may additionally be included, so that when the correct condition is set, this is held. The reference voltage is then given by:

$$V_{(ref)} = V_{(start)} + \int_0^t V_{(new)} dt \quad (10)$$

so that the phase modulation is controlled to sweep a complete 2π period of the intensity waveform or fringe.

In a further embodiment, the rate is extracted by multiplying by sine and cosine and integrating over the whole fringe spanned by the phase modulation. This is given by:

$$\Omega = \frac{1}{S}\tan^{-1}\left[\frac{\int \Delta_i \sin\omega t \, dt}{\int \Sigma_i \cos\omega t \, dt}\right] \quad (11)$$

This approach works satisfactorily but it could be improved at low rates as there is a lot of data in the least sensitive region of the gyro, at the peaks and troughs of the cosine wave around 0 and π (the least sensitive points) and the points of inflection, the most sensitive points at low rate, are around π/2 and 3π/2. It is at these points of inflection that the most sensitive regions lie as, for any given rate, the largest separation of clockwise and counterclockwise signals occur. Thus, in some of the above schemes, there may be an excess of noise at low rate. Normally a square wave modulation is used which gives peak sensitivity at low rates but suffers from a lack of linearity at high rates unless used in a closed loop scheme. The approach described with reference to FIGS. 8(a) and (b) uses the benefits of an open loop scheme with very good scale factor performance over a broad rate range but also with very good bias stability and reduced noise at low rates. The aim is to approach the sensitivity of the use of square wave modulation to give good sensitivity at low rates, but still be able to operate with the same scheme over a broad rate range with excellent linearity.

Accordingly, we have developed a novel alternative to the linear ramp used earlier, which comprises a non-linear ramp which concentrates the data points around the maximum sensitivity regions at low rates at the points of inflection. In this way a good balance is achieved between low rate performance when the best gyro bias is needed, while retaining the excellent scale factor performance at high rates.

In this further embodiment the same basic signal processing is used with integrals over the complete fringe, but there is an extra multiplicative factor due to the integrals not being simple. This factor will, however, be constant and so can be used for all rates when they have been determined.

Figure 8A:
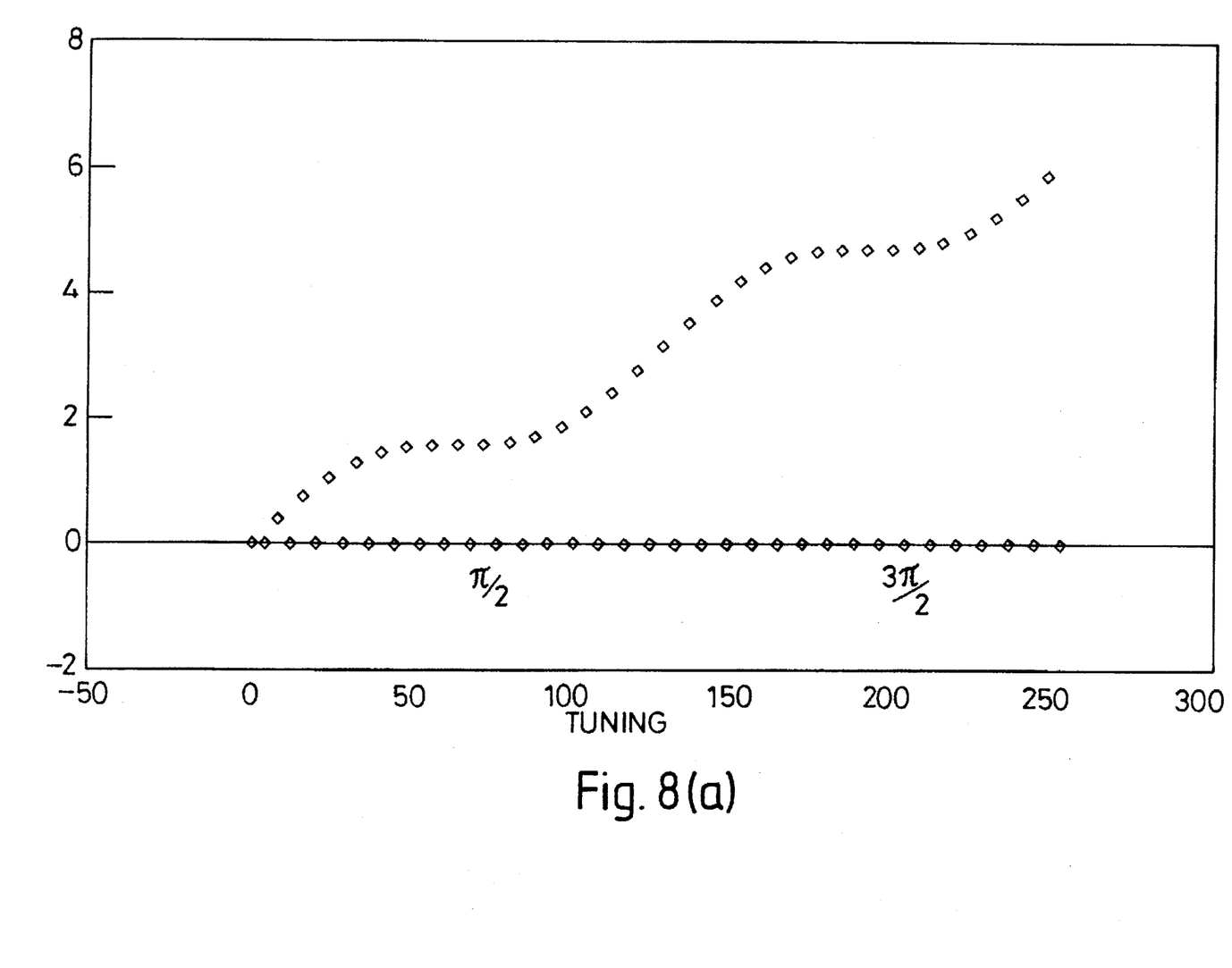
FIGS. 8(a) and (b) are graphs representing a modulator drive signal with a sinusoidally distorted ramp profile, and the corresponding output signal from the rate sensor, respectively.
Figure 8B:
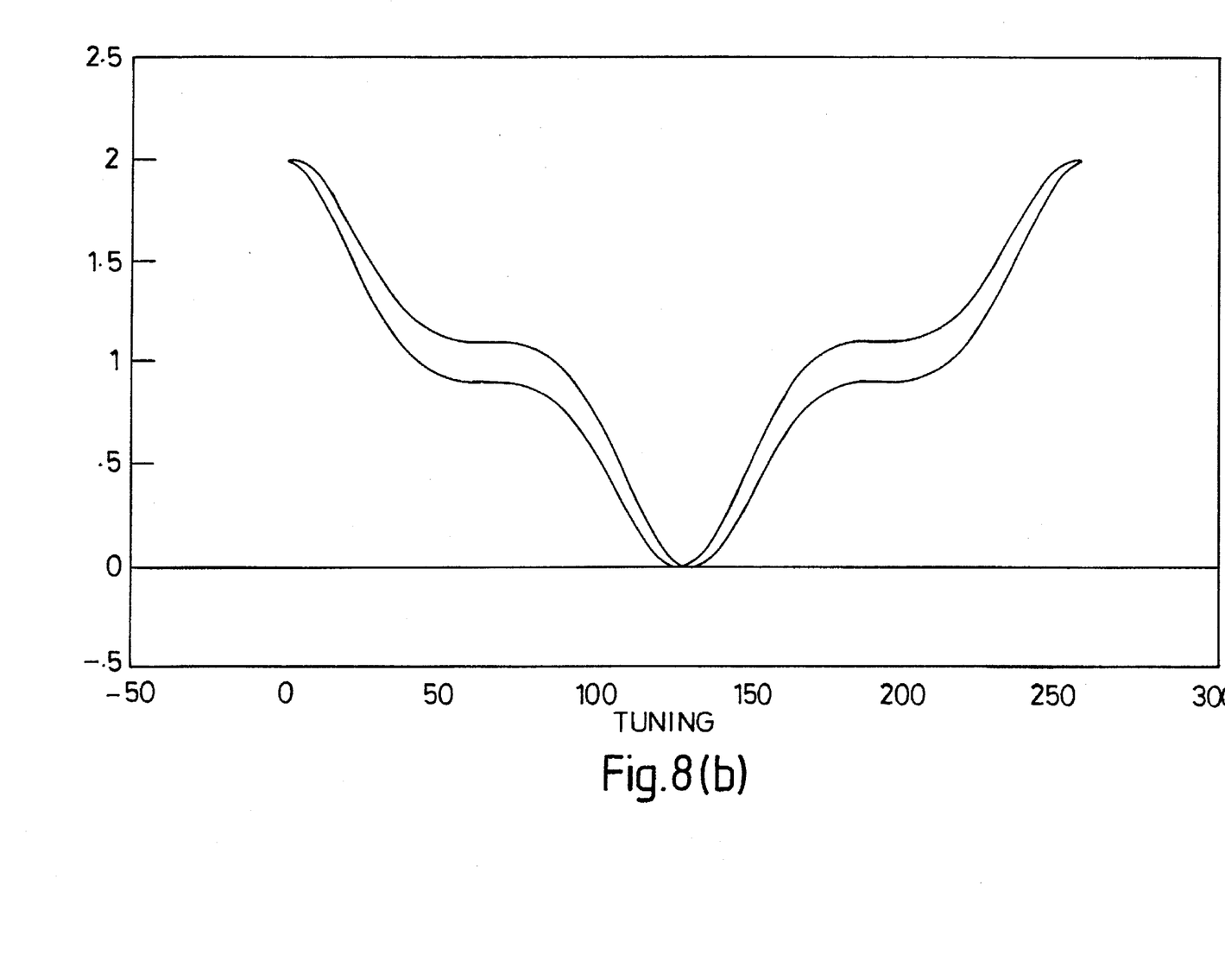
Figure 9A:
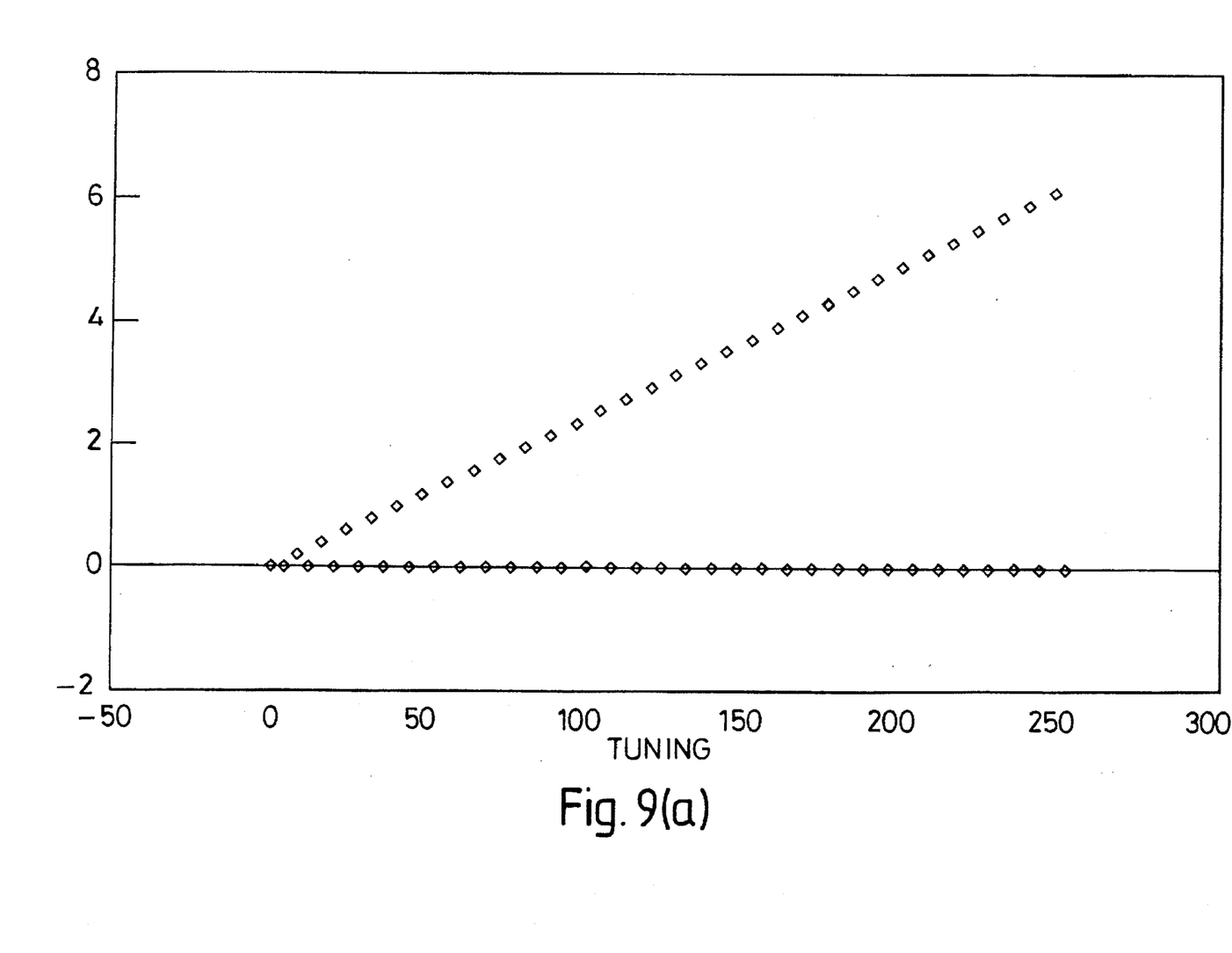
FIGS. 9(a) and (b) are graphs representing a modulator drive signal with a linear ramp profile, and the corresponding output signal from the rate sensor, respectively.
Figure 9B:
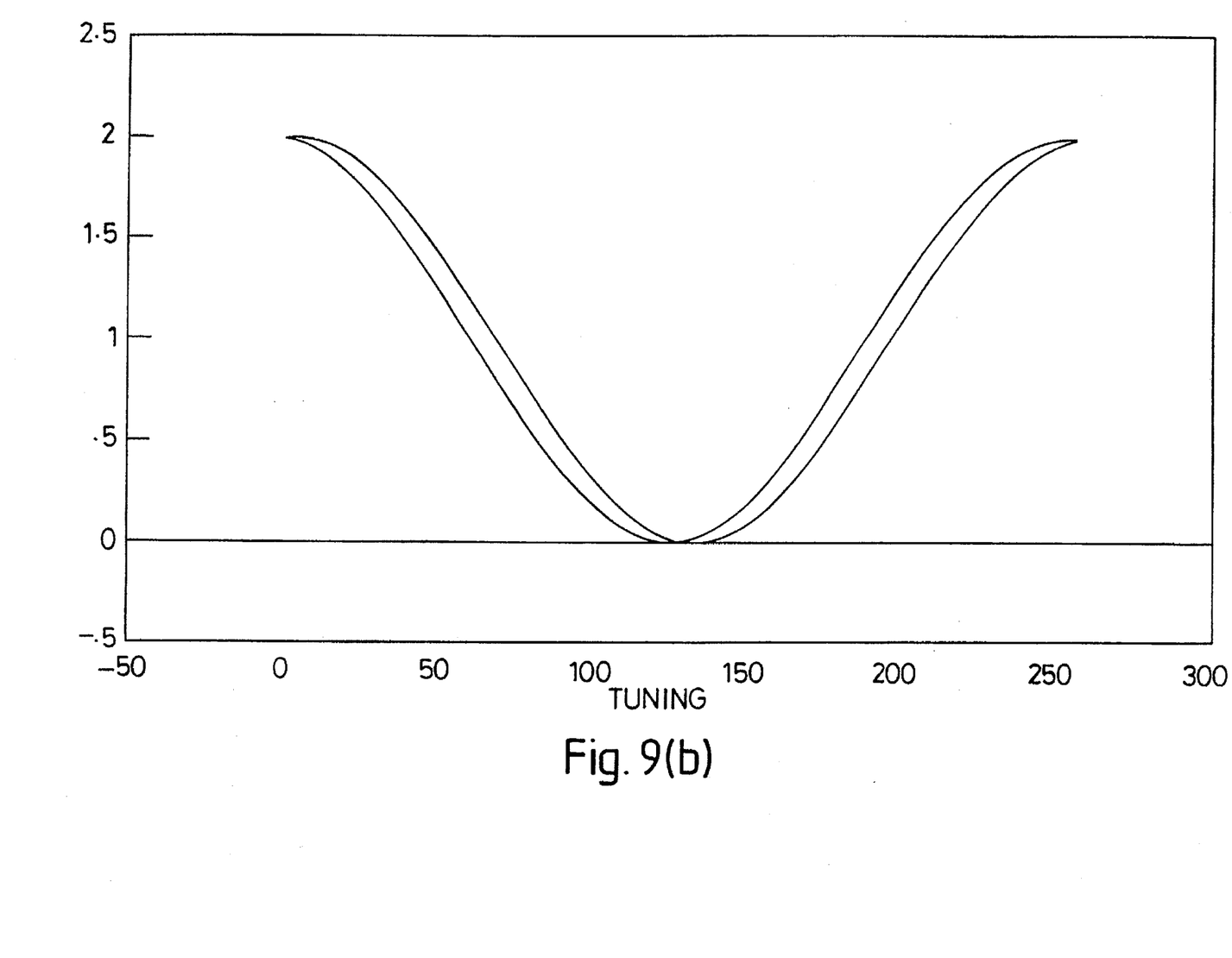

An example of the form of a ramp profile function which has a better clustering of points is shown below:

$\phi_i = \omega t_i + 0.5 \sin(2\omega t_i)$ compared with $\phi_i = \omega t_i \quad (12)$ The effects of the distortion are shown in FIGS. 8(a) and (b) for both zero rate and with a small applied rate, with FIGS. 9(a) and (b) showing the corresponding curves for the non-distorted or linear ramp for comparison. As will be seen in FIG. 8(a), the linear ramp has been distorted by a sin 2ω component so that more points are clustered around π/2 and 3π/2. These regions result in a distortion of the output waveform of the gyroscope, as seen in FIG. 8(a), so that instead of a generally cosinusoid form, the waveform is distorted at what would normally be the regions of maximum slope of the cosinusoid to provide additional sampling points.

A computer model is attached in Appendix B for the distorted form of function which gives the multiplicative constant c, equal to 0.3888402 when the non-linearity of the drive is set with a multiplying constant of 0.5. This is the second term in equation (B) above. In this case the rate is now determined by:

$$\Omega = \frac{1}{S} \tan^{-1}\left[\frac{\int\Delta\sin\Phi t dt}{c\int\Sigma\cos\Phi dt}\right] \quad (13)$$

The factor c has been added to the equation. As the function is still periodic over the complete fringe, with added higher harmonics, the integrals still eliminate the constant term from the sum integral allowing the inverse tangent to be used to give the rate. In the same way as before, the peak height of the drive signal is adjusted in a closed loop servo to maintain the $2\pi$ condition. The same integral as before is used, and this has the correct discriminant to drive the servo to luck to the $2\pi$ condition, but with a slightly different scale factor.

This development represents an improved approach to the signal processing of a digital interferometric fiber optic rate sensor with an open loop scheme which can be easily implemented using a digital signal processor to do the calculations. The detailed form of the function is not critical, but it should have the effect of clustering the points around the points of inflection at low rate and retain periodicity over the complete fringe. An example of a suitable form has been given above.

This should give the benefits of very good bias stability end resolution of low rates (similar to a square modulation) but with the benefits of excellent linearity at high rates. Also, the scheme should not suffer lock-in at low rates which can affect the closed loop schemes. The closed loop schemes also suffer from reduced bandwidth, where the bandwidth of this scheme is set by the sample interval which is set arbitrarily.

```
Appendix A  Fortran program to simulate signal processing
c           program to implement phase locked loop for IFOG
c
            implicit real*8(a-h,o-z)
            dimension r(12),r1(12)
            write(*,*)" input gain of loop"
            read(*,*)gain
            res1=0.d0
            phase=0.d0
            sum1=0.d0
            sum11=0.d0
            phase1=0.d0
            pi=datan(1.d0)*4.d0
            pim=-pi
            dphase=pi/50.0d0
            dphase1=pi/51.0d0
            do ii=1,100
            rate=ii
            rate=rate/50.0-1.0
            sum=0.0
            sum1=0.0
            suma=0.0
            suma1=0.0
            call seed(7)
c           starting values of phase
            do i=1,5000
c           loop to step over phases
            phase=phase+dphase
            phase1=phase1+dphase1
c           this is the signal
               sr=0.0
               sr1=0.0
               do j=1,12
                  call random(r(j))
                  call random(r1(j))
                  sr=sr+r(J)*0.001d0
                  sr1=sr1+r1(j)*0.001d0
               end do
            sr=sr/dsqrt(12)
            sr1=sr1/dsqrt(12)
            s1=(1.d0+sr)*(1.d0+cos(-phase1+rate))
```

-continued

```
            s2=(1.d0+sr1)*(1.d0+cos(+phase1+rate))
            sig=s2+s1
            siga=s2-s1
            ref1=sin(phase)
            ref2=cos(phase)
            sum=sum+sig*ref1
            sum1=sum1+sig*ref2
            suma=suma+siga*ref1
            suma1=suma1+siga*ref2
            if(mod(i,100) .eq. 0)then
               res1=res1
               res1=datan2(sum,sum1)
               dre1=res1-res1
               if(dre1 .gt. pi) dre1=dre1-2.d0*pi
               if(dre1 .lt. pim) dre1=dre1+2.d0*pi
               sum1=sum
               sum11=sum1
               sum=0.d0
               sum1=0.d0
               amp=dsqrt(sum1**2+sum11**2)
               ampa=-dabs(suma)/suma*dsqrt(suma**2+suma1**2)
               dphase1=dphase1+gain*dre1
               write(*,*)dre1,amp,ampa
                  write(*,*)dre1,rate,rate1
               rate1=atan2(ampa,amp)
               suma=0.0
               suma1=0.0
            end if
            end do
            write(*,*)dre1,rate,rate1
            end do
            stop
            end
            implicit real*8(a-h,o-z)
            open(8,file='e:\temp\gyro)3.dat',status='old')
c
c
c
c           program to calculate the coefficent
c           for distorted waveform algorithm
c
c
            rate=0.1
            p2=8*datan(1.d0)
            do j=1,50
               c1=0
               c2=0
               s1=0
               s2=0
               rte=j
               rte=rte/50
               do i=0,255
                  rr=float(i)/256.0
                  p=rr*p2+rte*sin(2*p2*rr)
                  sr1=1+dcos(-p+rate)
                  sr2=1+dcos(P+RATE)
                  si=dsin(p)
                  ci=dcos(p)
                  sum=sr1+sr2
                  dif=sr1-sr2
                  c1=c1+ci*sum
                  c2=c2+ci*dif
                  s1=s1+si*sum
                  s2=s2+si*dif
                  write(*,*)c1,c2,s1,s2
               end do
               rat=tan(rate)
               rat1=s2/c1
               ratio=rat/rat1
               phi=s1/c1
               write(8,*)rte,ratio,phi
            end do
            close(unit=8)
            stop
            end
```

I claim:

1. An optical rate sensor, comprising:

means defining one of a coil and ring around a sensing axis and around which light may propagate in a clockwise and a counterclockwise direction;

beam input means for introducing into said one of said coil and ring a clockwise beam and a counterclockwise beam to propagate in opposite directions around said one of said coil and ring;

means for combining said clockwise beam and said counterclockwise beam after passage around said one of said coil and ring;

detector means for detecting an intensity of said combined clockwise beam and said counterclockwise beam;

phase modulator means for modulating each of said clockwise beam and said counterclockwise beam into a repeating series of relative phase shifts, said repeating series of relative phase shifts comprising:

a plurality of relative positive phase shifts including one relative positive phase shift having a predetermined first magnitude, a plurality of relative negative phase shifts including one relative negative phase shift corresponding to said one relative positive phase shift and having a predetermined second magnitude equal to said first magnitude, said plurality of relative positive phase shifts being substantially equal and opposite to said plurality of relative negative phase shifts; and processor means for monitoring corresponding detected intensities for each of said plurality of relative positive phase shifts and said plurality of relative negative phase shifts to determine a rotation rate applied to said optical rate sensor about said sensing axis.

2. An optical rate sensor according to claim 1, wherein:

said plurality of relative positive phase shifts and said plurality of relative negative phase shifts are each sufficient to sample substantially a complete fringe.

3. An optical rate sensor according to claim 1, wherein:

said phase modulator means applies to both said clockwise beam and said counterclockwise beam, at one end of said one of said coil and ring, a stepped modulation waveform wherein a duration of each step is substantially equal to a transit time of said one of said coil and ring.

4. An optical rate sensor according to claim 1, wherein:

said repeating series of relative phase shifts include a repeating series of steps varying from a preset minimum value to a preset maximum and returning to said preset minimum value between each step of said repeating series of steps, a profile of a ramp defined by said repeating series of steps is non-linear.

5. An optical rate sensor according to claim 1, wherein:

said repeating series of relative phase shifts include a ramp comprising a repeating series of steps varying from a preset minimum value to a preset maximum and returning to said preset minimum value between each step of said repeating series of steps, and a profile of said ramp is generally linear with a periodic modulation component.

6. An optical rate sensor according to claim 5, wherein:

said periodic modulation component is of sinusoidal form.

7. An optical rate sensor according to claim 1, wherein:

said plurality of relative positive phase shifts have respective predetermined first magnitudes;

said plurality of relative negative phase shifts correspond respectively to said plurality of relative positive phase shifts and have respective predetermined second magnitudes; and said respective predetermined first magnitudes are respectively equal to said corresponding ones of said respective predetermined second magnitudes.

8. An optical rate sensor, comprising:

means defining one of a coil and ring around a sensing axis and around which light may propagate in a clockwise and a counterclockwise direction;

beam input means for introducing into said one of said coil and ring a clockwise beam and a counterclockwise beam to propagate in opposite directions around said one of said coil and ring;

means for combining said clockwise beam and said counterclockwise beam after passage around said one of said coil and ring;

detector means for detecting an intensity of said combined clockwise beam and said counterclockwise beam;

phase modulator means for modulating each of said clockwise beam and said counterclockwise beam into a repeating series of relative phase shifts, said repeating series of relative phase shifts comprising:

a plurality of relative positive phase shifts including one relative positive phase shift having a predetermined first magnitude, a plurality of relative negative phase shifts including one relative negative phase shift corresponding to said one relative positive phase shift and having a predetermined second magnitude equal to said first magnitude; and processor means for monitoring corresponding detected intensities for each of said plurality of relative positive phase shifts and said plurality of relative negative phase shifts to determine a rotation rate applied to said optical rate sensor about said sensing axis;

said repeating series of relative phase shifts including corresponding respective pairs of said plurality of relative positive phase shifts and said plurality of relative negative phase shifts having substantially a same magnitude, said corresponding respective pairs progressively varying through said repeating series of relative phase shifts.

9. An optical rate sensor according to claim 8, wherein:

said same magnitude of said corresponding respective pairs of said plurality of relative positive phase shifts and said plurality of relative negative phase shifts increases in a stepped linear fashion from 0 to $2\pi$.

10. An optical rate sensor according to claim 9, further comprising:

servo control means for controlling a maximum relative phase modulation to be $2\pi$.

11. An optical rate sensor, comprising:

means defining one of a coil and ring around a sensing axis and around which light may propagate in a clockwise and a counterclockwise direction;

beam input means for introducing into said one of said coil and ring a clockwise beam and a counterclockwise beam to propagate in opposite directions around said one of said coil and ring;

means for combining said clockwise beam and said counterclockwise beam after passage around said one of said coil and ring;

detector means for detecting an intensity of said combined clockwise beam and said counterclockwise beam;

phase modulator means for modulating each of said clockwise beam and said counterclockwise beam into a repeating series of relative phase shifts, said repeating series of relative phase shifts comprising:
- a plurality of relative positive phase shifts including one relative positive phase shift having a predetermined first magnitude,
- a plurality of relative negative phase shifts including one relative negative phase shift corresponding to said one relative positive phase shift and having a predetermined second magnitude equal to said first magnitude; and processor means for monitoring corresponding detected intensities for each of said plurality of relative positive phase shifts and said plurality of relative negative phase shifts to determine a rotation rate applied to said optical rate sensor about said sensing axis;

said phase modulator means applying to both said clockwise beam and said counterclockwise beam, at one end of said one of said coil and ring, a stepped modulation waveform wherein a duration of each step is substantially equal to a transit time of said one of said coil and ring; and said stepped modulation waveform having a varying magnitude of 0, $\Delta\phi_1$, 0, $\Delta\phi_2$, 0, $\Delta\phi_3$ ... $2\pi$, whereby a modulation of said stepped modulation waveform sweeps across $2\pi$ of an intensity fringe.

12. An optical rate sensor according to claim 8, 9, 10, 3 or 11, wherein:

for each magnitude of said plurality of relative positive phase shifts and said plurality of relative negative phase shifts, said processor means monitors a first detected intensity for a positive phase shift and a second detected intensity for a negative phase shift.

13. An optical rate sensor according to claim 12, wherein:

said processor means determines a sum and a difference of said first detected intensity and said second detected intensity monitored for each magnitude of said plurality of relative positive phase shifts and said plurality of relative negative phase shifts to obtain a series of sum data and a series of difference data, respectively.

14. An optical rate sensor according to claim 12, wherein:

said processor means determines a rate experienced by said optical rate sensor on a basis of at least one of said series of sum data and said series of difference data.

15. An optical rate sensor according to claim 14, wherein:

said processor means applies a Fourier Transform to at least one of said series of sum data and said series of difference data to obtain said rotation rate applied to said optical rate sensor about said sensing axis.

16. An optical rate sensor according to claim 14, wherein said processor means comprises:

means for multiplying said series of sum data by a cosine function and performing an integration to provide a first signal;

means for multiplying said series of sum data by a sine function and performing an integration to provide a second signal;

means for multiplying said series of difference data by a cosine function and performing an integration to provide a third signal; and means for multiplying said series of difference data by a sine function and performing an integration to provide a fourth signal; and means for using said first signal, said second signal, said third signal, and said fourth signal to obtain said rotation rate applied to said optical rate sensor about said sensing axis.

17. A method of detecting angular rotation, comprising steps of:

causing light to propagate as a clockwise beam and a counterclockwise beam around one of a coil and ring disposed around a sensing axis;

combining said clockwise beam and said counterclockwise beam after passage around said one of said coil and ring;

detecting an intensity of said combined clockwise and counterclockwise beams;

applying to said clockwise beam and said counterclockwise beam a periodic non-reciprocal phase shift modulation which comprises a repeating series of phase shifts made up from a plurality of positive and negative phase shifts of predetermined equal and opposite magnitudes; and monitoring corresponding intensities of said combined clockwise and counterclockwise beams for each of said repeating series of phase shifts to determine a rotation applied to said one of said coil and ring about said sensing axis.

18. An optical rate sensor, comprising:

means defining one of a coil and ring around a sensing axis and around which light may propagate in a clockwise and a counterclockwise direction;

beam input means for introducing into said one of said coil and ring a clockwise beam and a counterclockwise beam to propagate in opposite directions around said one of said coil and ring;

means for combining said clockwise beam and said counterclockwise beam after passage around said one of said coil and ring;

detector means for detecting an intensity of said combined clockwise beam and said counterclockwise beam;

phase modulator means for modulating each of said clockwise beam and said counterclockwise beam into a periodic non-reciprocal phase shift signal comprising a plurality of pulses of a first duration substantially equal to an optical transit time of said one of said coil and ring and spaced by an interval of a second duration substantially equal to said optical transit time, a magnitude of said plurality of pulses in each period varying from a minimum to a maximum, whereby relative phase shifts applied between said clockwise beam and said counterclockwise beam comprise a series of pairs of substantially equal and opposite phase shifts; and processor means for determining, for each pair of said series of pairs of substantially equal and opposite phase shifts, sums and differences of corresponding intensities of said combined clockwise and counterclockwise beams and for using at least one of said sums and said differences to monitor a rotation rate applied to said optical rate sensor.

* * * * *